3,085,942
ANTITUSSIVE COMPOSITIONS AND PREPARATION

Louis Magid, Clifton, and Michael Weiss, Paramus, N.J., assignors to Hoffmann-La Roche Inc., Nutley, N.J., a corporation of New Jersey
No Drawing. Filed Dec. 28, 1960, Ser. No. 78,859
10 Claims. (Cl. 167—67)

The instant invention relates to the preparation of novel compositions containing dextromethorphan or an acid addition salt thereof. More particularly, the present invention relates to compositions containing dextromethorphan or an acid addition salt thereof and magnesium trisilicate.

The antitussive action of dextromethorphan (d-3-methoxy-N-methylmorphinan) and its acid addition salts is known to the art. See for example the Merck Index, 7th ed. (1960), page 669. The conventional commercial form is dextromethorphan hydrobromide. Dispensing in the form of lozenges, such as chewable or suckable compressed tablets or candy form, for prolonged oral administration, has heretofore not been feasible because of the very bitter tast of dextromethorphan and its salts which has not been satisfactorily masked by the use of sweetening agents.

It has now surprisingly been found that when dextromethorphan or its acid addition salts are intimately mixed with magnesium trisilicate, the bitter taste is reduced or eliminated.

Furthermore, the mixture of dextromethorphan or an acid addition salt thereof and magnesium trisilicate has a low order of acute toxicity while maintaining a satisfactory level of antitussive activity.

Additionally, the mixture is stable over long periods of time.

While the invention is not to be limited by theoretical considerations, it is believed that dextromethorphan and its acid addition salts are at least in part adsorbed on the magnesium trisilicate. For purposes of discussion, however, the intimate mixture of dextromethorphan or an acid addition salt thereof with magnesium trisilicate will be referred to as an "adsorbate."

The adsorbate of the invention is formed by mixing a solution of dextromethorphan or an acid addition salt thereof in an inert solvent with magnesium trisilicate, intimately mixing to form a slurry, and then removing the solvent to leave the adsorbate as a white free-flowing powder. The solvents that can be employed for this purpose include water; the lower alkanols, such as methanol, ethanol, isopropyl alcohol and the like; lower aliphatic hydrocarbons such as petroleum ether; benzene; or polyhalogenated lower hydrocarbons such as chloroform, methylene chloride; or other suitable solvents; with water and the alkanols preferred. Miscible mixtures of solvents, such as a mixture of water and a lower alkanol, can also be employed. The quantity of solvent employed to form the solution is not critical; only the minimum quantity needed to dissolve the dextromethorphan or its salt at a given temperature is required. Excess solvent can be employed if desired, and in some instances may be advantageous, particularly where a low potency adsorbate is desired.

It has been found that the particle size of magnesium trisilicate employed is not critical in preparing the adsorbates of the invention. The average particle size of the magnesium trisilicate is preferably in the range of from about 0.1 to about 150 microns, and more preferably below about 45 microns (325 mesh).

The acid addition salts of dextromethorphan are the addition salts of medicinally acceptable acids, such as the hydrochloride, hydrobromide, orthophosphate, benzoate, etc. The preferred salt is the hydrobromide salt.

The weight percent of dextromethorphan or an acid addition salt thereof, based on the weight of adsorbate, is in the range of from about 2 to about 20%, with from about 5 to about 10% preferred.

The adsorbate prepared as above can be mixed with other ingredients to form compressed tablet, candy lozenges, chewing gum tablets and the like. The ingredients which are mixed with the adsorbate of the invention to form the lozenges of the invention are pharmaceutical adjuvant materials which are standard in the lozenge art. For example, when forming compressed tablets, granulated sugar, gelatin, flavoring agents such as menthol, peppermint, butterscotch, cherry, and other suitable flavoring agents, lubricants such as talc, magnesium stearate, stearic acid, mineral oil, etc., and edible dyes are typically employed.

An alternative method of preparing compressed tablets comprises mixing the adsorbate slurry with the pharmaceutical adjuvant materials and then removing the solvent after the formulation is complete.

When candy lozenges are formulated, the adsorbate is added to a molten mixture of pharmaceutical adjuvant materials such as glucose, sucrose, flavoring, and edible dyes, intimately mixed, and allowed to harden.

The quantity of adsorbate used to form the lozenges of the invention is chosen so that from about 5 to about 30 mg., preferably from about 7.5 to about 10 mg., of dextromethorphan, or an acid addition salt thereof, is present per unit lozenge. The unit size of lozenge employed is not critical, and will range preferably from about ½ g. to about 4 g., depending in part on whether compressed tablet or candy lozenges are being formulated.

The invention will be better understood by reference to the following examples which are given for illustrative purposes only and are not intended to limit the invention.

EXAMPLE 1

A mixture of 1 g. of dextromethorphan hydrobromide and 19 g. of magnesium trisilicate having an average particle size of 5 microns is prepared by dissolving the dextromethorphan hydrobromide in 7 g. of distilled water (80° C.), and then pouring the resulting solution onto the magnesium trisilicate. The resulting mixture is then thoroughly mixed by stirring to form a slurry. The solvent is then removed by spray-drying. 20 g. of a white free-flowing powder are obtained, containing 5% by weight of dextromethorphan hydrobromide.

EXAMPLE 2

An intimate mixture of 1 g. of dextromethorphan hydrobromide and 15 g. of magnesium trisilicate having an average particle size of 44 microns (325 mesh) is prepared by dissolving the dextromethorphan hydrobromide in 10 g. of isopropanol, and then pouring the resulting solution onto the magnesium trisilicate and throughly mixing the resulting mixture by stirring to form a slurry. The solvent is then removed from the slurry by drying on trays at 110° F. 16 g. of a white free-flowing powder are obtained, containing 6.25% by weight of dextromethorphan hydrobromide.

EXAMPLES 3 THROUGH 6

The procedure for Example 1 is followed for Examples 3 through 6 except that 11.5, 9, 7, and 4 g. of magnesium trisilicate, respectively, are employed. The quantity of dextromethorphan hydrobromide, and the quantity and type of solvent employed are identical to that employed in Example 1. 12.5, 10, 8, and 5 g., respectively, of white free-flowing powders are obtained, containing, respectively 8, 10, 12.5, and 20% by weight of dextromethorphan hydrobromide.

EXAMPLE 7

51 g. of dextromethorphan hydrobromide and 4 g. of soluble saccharin are dissolved in 360 g. of potable water at 80° C. 945 g. of magnesium trisilicate (average particle size 44 microns) is added to the above solution and intimately stirred to form a slurry. The slurry is then spray dried to remove the water. A free-flowing white powder remains which possesses a slightly sweetish taste, containing 5.1% by weight of dextromethorphan hydrobromide. The identical formulation without the magnesium trisilicate has a very bitter taste.

EXAMPLE 8

The adsorbate of Example 2 is formed into compressed tablets according to the following formula:

*Compressed Tablet Formula*

Mix: For 1000 lozenges

| | | |
|---|---|---|
| (1) | Adsorbate | 306 g. (contains 5% by weight of dextromethorphan hydrobromide). |
| (2) | Sugar, 4X | 700 g. |

Then granulate with a solution of:

| | | |
|---|---|---|
| (3) | Gelatin | 10 g. |
| (4) | Corn syrup | 7.7 g. (solids). |
| (5) | Coloring agent | 0.22 g. |
| (6) | Sodium chloride in | 0.8 g. |
| (7) | Distilled water | 63 ml. |

Pass through No. 4 mesh. Dry at 115° F. Grind to No. 12 mesh.

Add and mix:

| | | |
|---|---|---|
| (8) | Talc U.S.P. | 20 g. |
| (9) | Magnesium stearate | 10 g. |
| (10) | Menthol | 1 g. |
| (11) | Peppermint flavor | 1 g. |

Compress into tablets, each weighing approximately 1.06 grams.

EXAMPLE 9

Dextromethorphan base is incorporated into a compressed tablet lozenge according to the following procedure.

A. *Preparation of Solution of Dextromethorphan Base in Oil*

Dissolve: For 1000 lozenges

| | | | |
|---|---|---|---|
| (1) | Dextromethorphan | g | 7.74 |
| (2) | Coconut oil | g | 70 |
| (3) | Stearic acid | g | 7 |
| (4) | Insoluble saccharin | g | 0.5 |
| (5) | Isopropyl alcohol | cc | 10 |

B. *Adsorption of A*

Mix A above intimately with a mix of:

| | | | |
|---|---|---|---|
| (1) | Magnesium trisilicate | g | 200 |
| (2) | Sugar, 4X | g | 665 |

C. *Granulation of Mix B*

Prepare granulating solution of the following composition:

| | | | |
|---|---|---|---|
| (1) | Gelatin | g | 25 |
| (2) | Water | g | 153 |
| (3) | Corn syrup | g | 24 | and use to granulate mix B. Grind to 4 mesh and dry at 110° F. for 20 hours. Grind to 14 mesh.

D. *Compression of Tablets*

Add flavors and lubricants to C and compress into tablets, each weighing approximately 1.06 grams.

The resulting tablets are very palatable and free of the very bitter taste of the free dextromethorphan base.

EXAMPLE 10

A candy lozenge is prepared by adding 115.2 g. of dextromethorphan hydrobromide adsorbate (4.72%) to a molten mixture (110° C.) of 5 pounds of a candy base containing 1.5 g. of coloring agent, 1.5 cc. of honey, 5 cc. of cherry flavor, and the remainder a mixture of 60% glucose-40% sucrose. The resulting mixture is well mixed, poured into candy molds and allowed to cool. The resulting candy lozenges have a typically sweet candy taste without any bitterness.

Variations of the processes and compositions of the invention can be undertaken by those skilled in the art without departing from the scope or spirit of the invention.

We claim:

1. As a composition of matter, an intimate admixture consisting essentially of magnesium trisilicate and from about 2 to about 20% by weight, based on the admixture, of a compound selected from the group consisting of dextromethorphan and medicinally acceptable acid addition salts thereof.

2. A composition of claim 1 wherein from about 5 to about 10% by weight of said compound is present in the composition.

3. A composition of claim 1 wherein said magnesium trisilicate has an average particle size about 0.1 to about 150 microns.

4. A composition of claim 1 wherein said compound is dextromethorphan.

5. A composition of claim 1 wherein said compound is dextromethorphan hydrobromide.

6. The process of preparing a composition of matter consisting essentially of magnesium trisilicate and a compound selected from the group consisting of dextromethorphan and medicinally acceptable acid addition salts thereof, comprising the steps of dissolving said compound in an inert solvent, intimately mixing magnesium trisilicate therewith to form a slurry, and removing the solvent from said slurry; the proportion of magnesium trisilicate employed being sufficient to give a composition containing from about 2 to about 20% by weight, based on the weight of composition, of said compound.

7. The process of claim 6 wherein said compound is dextromethorphan hydrobromide and said solvent is water.

8. The process of claim 6 wherein said compound is dextromethorphan and said solvent is a lower alkanol.

9. A lozenge containing (*a*) from about 5 to about 30 mg. of a compound selected from the group consisting of dextromethorphan and medicinally acceptable acid addition salts thereof, said compound being present in the form of an intimate mixture with magnesium trisilicate; the ratio of said compound to magnesium trisilicate ranging from about 2 to about 20 weight percent based on the total weight of both ingredients, and (*b*) pharmaceutical adjuvant material.

10. A lozenge according to claim 9 in which said ratio is in the range of about 5 to about 10%.

References Cited in the file of this patent

UNITED STATES PATENTS 1,334,463    Lilly    Mar. 23, 1920

OTHER REFERENCES

New and Non-Official Drugs (N.N.D.), 1959, J. B. Lippincott Co., Philadelphia, Pa., pages 325 and 326.